United States Patent
Menard et al.

(10) Patent No.: US 10,423,165 B2
(45) Date of Patent: Sep. 24, 2019

(54) METHOD FOR REMOTELY CONTROLLING A SYSTEM FOR CONTROLLING MANEUVER(S) OF A VEHICLE USING A CONTROL UNIT

(71) Applicant: VALEO SECURITE HABITACLE, Créteil (FR)

(72) Inventors: Eric Menard, Créteil (FR); Laurent Petel, Créteil (FR); Fabienne Masson, Créteil (FR)

(73) Assignee: VALEO SECURITE HABITACLE, Créteil (FR)

( * ) Notice: Subject to any disclaimer, the term of this patent is extended or adjusted under 35 U.S.C. 154(b) by 0 days.

(21) Appl. No.: 14/653,411

(22) PCT Filed: Dec. 17, 2013

(86) PCT No.: PCT/EP2013/076965
§ 371 (c)(1),
(2) Date: Jun. 18, 2015

(87) PCT Pub. No.: WO2014/095914
PCT Pub. Date: Jun. 26, 2014

(65) Prior Publication Data
US 2015/0359032 A1    Dec. 10, 2015

(30) Foreign Application Priority Data
Dec. 21, 2012    (FR) ...................................... 12 03586

(51) Int. Cl.
*G01D 1/02*    (2006.01)
*H04L 1/08*    (2006.01)
(Continued)

(52) U.S. Cl.
CPC .......... *G05D 1/0276* (2013.01); *G05D 1/0022* (2013.01); *H04L 1/08* (2013.01); *H04W 76/19* (2018.02)

(58) Field of Classification Search
CPC ..... H04L 1/08; H04W 76/028; G05D 1/0022; G05D 1/0276; B60R 25/24;
(Continued)

(56) References Cited
U.S. PATENT DOCUMENTS 6,748,211 B1 * 6/2004 Isaac ....................... H04W 4/14
455/414.1
6,836,862 B1    12/2004 Erekson et al.
(Continued)

FOREIGN PATENT DOCUMENTS
EP    2295281 A1    3/2011

OTHER PUBLICATIONS
International Search Report issued in PCT/EP2013/076965, dated Jan. 24, 2014 (2 pages).
(Continued)

*Primary Examiner* — Stephen Holwerda
(74) *Attorney, Agent, or Firm* — Osha Liang LLP

(57) ABSTRACT

A system (SC) is intended to control a maneuver of a vehicle (V) via the establishment of two-way wireless communication between a communication module (MC1) of the vehicle (V) and a remote control unit (BC), following the actuation of the latter. This system (SC) includes components designed to determine, over a duration corresponding to a chosen main number (NP) of successive connection events in their respective frequency channels, where the chosen main number (NP) is greater than 2, a first number of failed connection events, and then to compare this first number with a first chosen value and to modify the activated
(Continued)

automatic maneuver in a chosen way if the first number is greater than or equal to this first value.

17 Claims, 1 Drawing Sheet

(51) Int. Cl.
*G05D 1/02* (2006.01)
*G05D 1/00* (2006.01)
*H04W 76/19* (2018.01)

(58) Field of Classification Search
CPC ...... G07C 9/00309; G07C 2009/00793; E05B 77/48; E05B 17/10; E05B 81/78
See application file for complete search history.

(56) References Cited

U.S. PATENT DOCUMENTS

| | | | |
|---|---|---|---|
| 2002/0063472 A1* | 5/2002 | Irvin | B60R 25/2009 307/10.1 |
| 2003/0004613 A1 | 1/2003 | Hahn et al. | |
| 2009/0136035 A1* | 5/2009 | Lee | G07C 9/00309 380/270 |
| 2012/0313768 A1* | 12/2012 | Campbell | B60R 25/2009 340/438 |
| 2013/0099892 A1* | 4/2013 | Tucker | G07C 9/00309 340/5.61 |

OTHER PUBLICATIONS

French Search Report issued in PCT/EP2013/076965, dated Sep. 12, 2013 (2 pages).

* cited by examiner

METHOD FOR REMOTELY CONTROLLING A SYSTEM FOR CONTROLLING MANEUVER(S) OF A VEHICLE USING A CONTROL UNIT

TECHNICAL FIELD OF THE INVENTION

The invention relates to the field of remote control units responsible for the wireless control (at radio frequencies) of at least one function of a vehicle, which may or may not be a motor vehicle.

PRIOR ART

As is known to those skilled in the art, some remote control units, sometimes called electronic keys, comprise a human-machine interface enabling a user of a vehicle to activate at least one function offered by this vehicle, even if he is at a distance from the latter. For example, the human-machine interface may comprise operable or sensitive keys (or touch keys) used for the remote control of the central locking and unlocking of the side doors of the vehicle, and/or operable or sensitive keys (or touch keys) used for the remote control of the central locking and unlocking of the rear hatch (or tailgate) of the vehicle, and/or operable or sensitive keys (or touch keys) used for the remote control of the pre-conditioning (notably for heating, ventilation and air conditioning) of the vehicle, and/or operable or sensitive keys (or touch keys) used for the remote control of parking maneuvers.

These remote controls facilitate the daily activities and/or improve the comfort of the users of the vehicle.

More particularly, the invention relates to units enabling a vehicle user to remotely control a system installed in the vehicle and responsible for controlling at least one automatic maneuver.

As is known to those skilled in the art, at the present time, in order to launch (or activate) an automatic maneuver of a vehicle it is necessary to actuate a remote control unit so as to establish two-way wireless communication (at radio frequencies) between this unit and a communication module of the vehicle. This is because this two-way communication makes it possible to provide an exchange of information, for the purposes of the activated automatic maneuver, between the unit and the communication module.

This operating mode is found to be sensitive to interference (whether deliberate or involuntary) and to signal losses due to multiple paths, and may therefore result in a loss of control of the maneuver that is taking place.

BRIEF DESCRIPTION OF THE INVENTION

The object of the invention, notably, is to improve security in the remote control of a system for controlling maneuver(s) of a vehicle.

To this end, it proposes, notably, a method intended for remotely controlling a system for controlling at least one automatic maneuver of a vehicle via the establishment of two-way wireless communication between a remote control unit and a communication module of the vehicle, following an actuation of this unit, this two-way communication being intended to result in an exchange of information, for the purposes of the activated automatic maneuver, between the unit and the communication module, in the course of connection events, having a chosen duration, which are repeated periodically in frequency channels differing from one connection event to another according to a predetermined frequency channel hopping protocol, and which may be either successful or failed.

This method is characterized in that it comprises:
- a step (i) in which a first number of failed connection events is determined over a duration corresponding to a chosen main number NP of successive connection events in their respective frequency channels, where NP>2,
- a step (ii) in which this first number is compared with a first chosen value, and
- a step (iii) in which the activated automatic maneuver is modified in a chosen way if the first number is greater than or equal to this first value.

The method according to the invention may have other characteristics which may be considered separately or in combination, notably:
- in step (i), a second number of consecutive failed connection events may be determined over the duration corresponding to the chosen main number of successive connection events in their respective frequency channels. In this case, in step (ii) this second number may be compared with a second chosen value, smaller than or equal to the first value, and in step (iii) the activated automatic maneuver may be modified in a chosen way if the second number is greater than or equal to this second value;
- in step (iii), the activated automatic maneuver may be stopped if the first number is greater than or equal to the first value, or if the second number is greater than or equal to the second value;
- each connection event may have a fixed duration in the range from approximately 5 ms to approximately 50 ms;
- this duration may, for example, be equal to 20 ms;
- the main number may, for example, be greater than or equal to 5;
  - the first value may, for example, be greater than or equal to 4;
    - the second value may, for example, be greater than or equal to 3;
- the two-way communication between the unit and the communication module of the vehicle may, for example, be of a type chosen from a group comprising standard wireless protocols such as at least Bluetooth® R, preferably in a version of the Bluetooth® Smart type (or BLE, for "Bluetooth Low Energy"), ANT+™ and Zigbee® (Bluetooth is a registered trademark of Bluetooth SIG, Inc., ANT+ is a trademark of Garmin Switzerland GmbH, Zigbee is a registered trademark of the ZigBee Alliance);
- the automatic maneuver may, for example, be chosen from (at least) a maneuver for automatic parking in a parking place, a maneuver for automatic departure from a parking place, a maneuver for opening a side door of the vehicle, a maneuver for closing a side door of the vehicle, a maneuver for opening a tailgate or hatch of the vehicle, and a maneuver for closing a tailgate or hatch of the vehicle;
- the action on the unit may, for example, be continuous.

The invention also proposes a control system intended to control at least one automatic maneuver of a vehicle via the establishment of two-way wireless communication between a communication module of the vehicle and a remote control unit, following the actuation of this unit; this two-way communication being intended to result in an exchange of information, for the purposes of the activated automatic maneuver, between the communication module and the unit, in the course of connection events, having a chosen duration, which are repeated periodically in frequency channels differing from one connection event to another according to a predetermined frequency channel hopping protocol, and which may be either successful or failed.

This system is characterized in that it comprises control means designed to determine, over a duration corresponding to a chosen main number NP of successive connection events in their respective frequency channels, where NP>2, a first number of failed connection events, and then to compare this first number with a first chosen value and to modify the activated automatic maneuver in a chosen way if the first number is greater than or equal to this first value.

For example, the two-way communication between the communication module of the vehicle and the unit may be of a type chosen from a group comprising at least Bluetooth®, preferably in a version of the Bluetooth Smart® type (or BLE, for "Bluetooth Low Energy"), ANT+ and Zigbee.

The invention also proposes a remote control unit capable of remotely controlling a control system capable of controlling at least one automatic maneuver of a vehicle via the establishment of two-way wireless communication between the unit and a communication module of the vehicle, following the actuation of the unit; this two-way communication being intended to result in an exchange of information, for the purposes of the activated automatic maneuver, between the unit and the communication module, in the course of connection events having a chosen duration, which are repeated periodically in frequency channels differing from one connection event to another according to a predetermined frequency channel hopping protocol, and which may be either successful or failed.

This unit is characterized in that it comprises control means designed to determine, over a duration corresponding to a chosen main number NP of successive connection events in their respective frequency channels, where NP>2, a first number of failed connection events, and then to compare this first number with a first chosen value and to modify the activated automatic maneuver in a chosen way if the first number is greater than or equal to this first value.

This unit may comprise a communication module capable of establishing two-way communication according to a protocol of the Bluetooth® type, preferably in a version of the Bluetooth Smart® type, or of the ANT+ type, or of the Zigbee type.

BRIEF DESCRIPTION OF THE DRAWINGS

Other characteristics and advantages of the invention will become evident on examination of the following detailed description, and of the attached drawings, in which.

DETAILED DESCRIPTION

The object of the invention is, notably, to propose a method intended for the wireless control (at radio frequencies) of a system SC intended to control at least one maneuver of a vehicle V, by means of a remote control unit D.

In the following text, it is considered, by way of non-limiting example, that the vehicle V is of the motor vehicle type. It is, for example, a motor car, a coach (or bus), a truck or a utility vehicle. However, the invention is not limited to this type of vehicle. Indeed it relates to any type of ground or sea-going (or river) vehicle capable of carrying out movements and maneuvers on the ground or on water.

In the following description it is also assumed, by way of non-limiting example, that the control system SC is intended to control at least one parking maneuver of the vehicle V, such as a maneuver enabling it to park automatically in a parking place PS or a maneuver enabling it to depart automatically from a parking place PS, without the driver's intervention. However, the invention is not limited to this type of maneuver. Indeed, it relates to any type of stationary or very low-speed maneuver that can be performed by a vehicle, notably a maneuver for opening a side door of the vehicle, a maneuver for closing a side door of the vehicle, a maneuver for opening a tailgate or hatch of the vehicle, or a maneuver for closing a tailgate or hatch of the vehicle.

Figure 1:
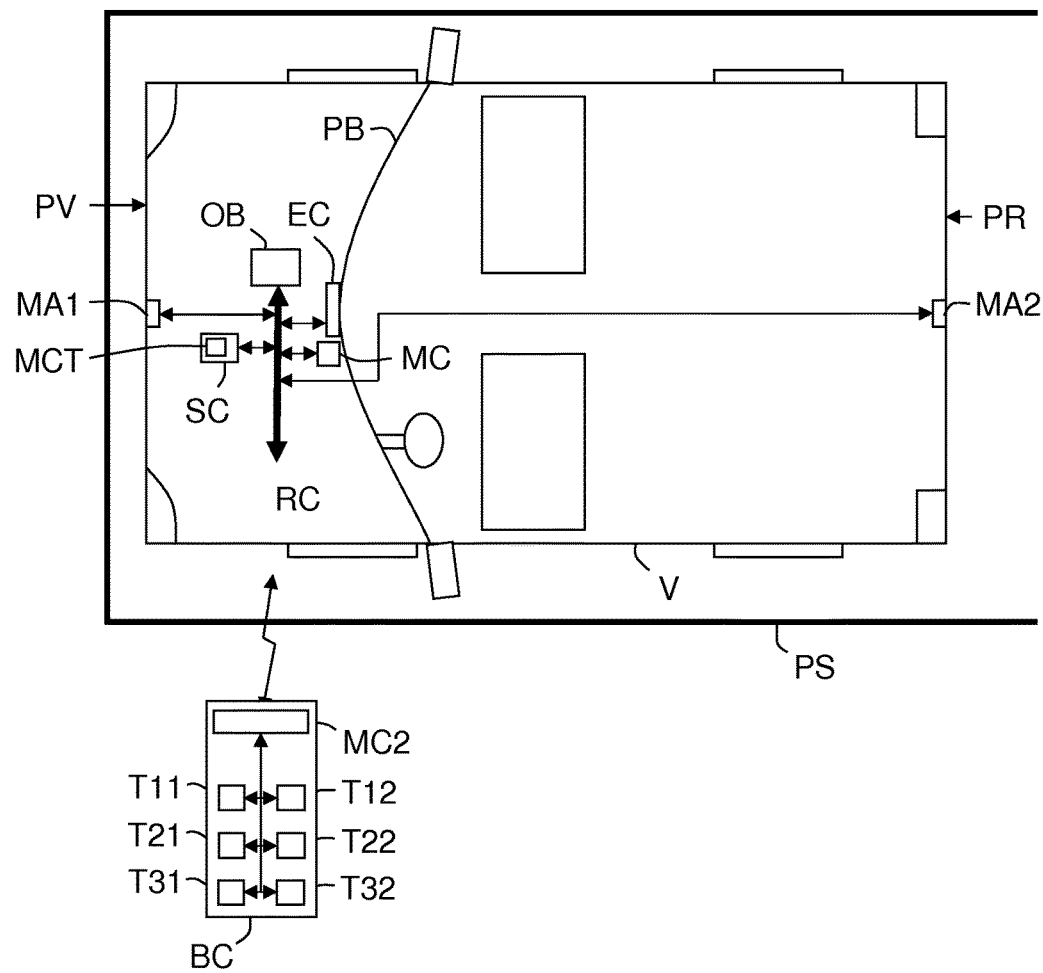
FIG. 1 shows in a schematic and functional way, in a top view, an example of a motor vehicle fitted with a system for controlling parking maneuvers, and an exemplary embodiment of a remote control unit according to the invention, capable of wirelessly controlling the aforesaid system.

FIG. 1 shows in a schematic and functional manner a motor vehicle V of the car type, fitted with a system SC for controlling maneuvers (parking maneuvers in this instance).

This car V further comprises, in a conventional way, a front part PV and a rear part PR opposed to the front part PV, an on-board computer OB, a dashboard PB, provided with a screen EC (in a central position), and a communications network RC, possibly of the multiplexed type, to which are connected, notably, the on-board computer OB, the screen EC and the system SC (for controlling parking maneuvers).

The system SC is intended to control the maneuvers of the vehicle V which enable it to park automatically in a parking place PS, or to depart automatically from a parking place PS, without the driver's intervention. This control is provided, notably, on the basis of image data which are supplied by acquisition means MAi installed in the vehicle V in at least two appropriate locations in its front part PV and rear part PR.

It should be noted that the system SC may, for example, be designed in the form of at least one computer comprising a combination of electronic circuits (or "hardware") and program modules (or software).

The acquisition means MAi may comprise, for example, at least wireless analysis means MA1 (i=1), such as radar or sonar detectors, fitted in the front part PV of the vehicle V (for example, in the fenders or guards), and at least one observation camera MA2 (i=2), called a reversing camera, fitted in the rear part PR of the vehicle V. As a variant and/or as a supplement to the wireless analysis means MA1, at least one front observation camera may be used. Similarly, as a variant and/or as a supplement to the reversing camera MA2, wireless analysis means may be used.

It should be borne in mind that the wireless analysis means provide inspection data, as a basis for generating a 2D, 2.5D or 3D map of the immediate environment outside the vehicle V.

It should be noted that the image data, supplied by the acquisition means MAi, may allow the generation of images to be displayed on the screen EC in order to facilitate the maneuvers of the vehicle V by its driver. These images may, if necessary, be generated by the system SC.

The system SC may be remotely controlled, wirelessly, by a remote control unit BC, according to the invention. More precisely, this unit (BC) is designed so as to communicate wirelessly (at radio frequencies) with a first communication module MC1 fitted in the vehicle V and coupled, at least, to the system SC, via the communications network RC for example. The unit (BC) comprises a second communication module MC2 for this purpose.

For example, the communications established between the first MC1 and second MC2 communication modules may conform to a protocol of the Bluetooth® type. This is because this technology offers a high level of intrinsic security because of its frequency hopping mechanism. Even more preferably, a version such as Bluetooth Smart® (or BLE, standing for "Bluetooth Low Energy", a version featuring low energy consumption) may be used. This is because the last-mentioned version (Bluetooth Smart® or BLE) consumes very little electrical energy and allows communication over distances of up to about 50 meters. However, other two-way communication protocols of the short range frequency hopping type may be used, notably the Wi-Fi protocol, the ANT+™ protocol or the Zigbee® protocol. (Bluetooth is a registered trademark of Bluetooth SIG, Inc., ANT+ is a trademark of Garmin Switzerland GmbH, Zigbee is a registered trademark of the ZigBee Alliance.)

Preferably, the unit BC also provides at least one start-up function responsible for supplying one or more predefined codes to the electronic starter of the vehicle V to put it into operation, in addition to the function of remotely controlling parking maneuvers. The unit also advantageously provides the functions of remotely locking and unlocking the side doors of the vehicle V, and, if necessary, a function of remote central locking and unlocking of a rear hatch (or tailgate) of the vehicle V.

These additional functions may advantageously be performed in a two-way communication between the unit BC and the vehicle. The protocol to be used for the information exchange may be the Bluetooth Smart® (or BLE, for "Blue tooth Low Energy") protocol. (Bluetooth is a registered trademark of Bluetooth SIG, Inc.)

In order to enable a user of the vehicle V to activate a function provided by the unit BC, the latter (BC) comprises, as shown in FIG. 1, a human-machine interface Tjk. This interface Tjk may, for example, comprise operable keys (such as push buttons) or sensitive keys (or touch keys). In the non-limiting example shown in FIG. 1, the human-machine interface comprises a first pair of keys T11 and T12 (j=1 and k=1 or 2), used, for example, for the central locking and unlocking of the side doors, a second pair of keys T21 and T22 (j=2 and k=1 or 2), used, for example, for the central locking and unlocking of the rear hatch, and a third pair of keys T31 and T32 (j=3 and k=1 or 2), used for the remote initiation of parking maneuvers for the automatic parking of the vehicle V in a parking place PS or for the automatic departure of the vehicle V from a parking place PS, without the driver's intervention.

In another embodiment, the locking and unlocking functions are of the hands-free type; that is to say, they do not require any actuation of a control element of the unit BC.

It is important to note that the application of the invention only requires at least one key T3k for the remote initiation of at least one maneuver (a parking maneuver in this instance).

According to the invention, the system MC comprises control means MCT, designed to intervene at least when a maneuver control function has been activated by a user of the vehicle V by means of the unit BC, in this case by the actuation of one of the keys B3k, by pressing for example. More precisely, when an activation of this type takes place, the control means MCT initiate the establishment of two-way wireless communication (at radio frequencies) between the first communication module MC1 of the vehicle V and the unit BC (or more precisely its second communication module MC2).

This two-way communication is intended to result in an exchange of information, for the purposes of the activated automatic maneuver, between the communication module MC1 and the unit BC, in the course of connection events ECi having a chosen duration ti, which are repeated periodically in frequency channels fi differing from one connection event ECi to another ECi+1 according to a predetermined (frequency channel) hopping protocol, and which may be either successful or failed.

The information exchange, during a connection event ECi, may be, in the case of a parking maneuver, of the question and response type; that is to say that, for example, the first communication module MC1 of the vehicle interrogates the unit BC via its communication module MC2 to discover, for example, whether the key T3k for the parking maneuver is depressed, by means of the message m1. The unit BC, via its communication module MC2, sends a response message m2 to the communication module MC1 of the vehicle. There are a number of possible cases: the response information may be received correctly by the vehicle so that the latter continues or stops its maneuver according to the state of the key T3k, or the information may not be received correctly, or may not be received at all, by the vehicle, in which case a new information exchange is carried out for the duration ti, or the connection event may be considered to have failed and the system carries out a new information exchange in the course of the next connection event Eci+1 at the frequency fi+1.

Thus, for each connection event ECi, the control means MCT will determine the validity of the information exchange. If at least one information exchange carried out is valid, the connection event is said to be successful. If no information exchange carried out is valid, the connection event is said to have failed. Clearly, over the duration ti of the connection event ECi, the same information exchange can be attempted more than once.

In another embodiment, the information exchange of the question and response type is replaced by an exchange of the notification and indication type. In this case, it is the communication module MC2 of the control unit that itself notifies the status of the key T3k to the communication module MC1 of the vehicle. The latter may respond by sending an indication to the communication module MC2 of the unit BC used for the current maneuver.

In this case, "message m1" or "response m2" are taken to mean signals defining a set of bits (or digital data) of predefined length in a predefined arrangement.

By way of non-limiting example, in a case where the Bluetooth Smart® (or BLE) protocol is used, the validity of an information exchange is assessed according to the following model (Bluetooth is a registered trademark of Bluetooth SIG, Inc.):

The master sends a question message m1 and
if the response message m2 is received with a correct length (number of bits) and with an appropriate integrity code (CRC), the message is valid and therefore the connection event is successful;
if the response message m2 is received with a correct length (number of bits) but with an inappropriate integrity code (CRC), the response message is not valid, but the system can repeat the exchange twice more before the exchange is declared invalid and the connection event therefore fails;

if the response message m2 is not received, or is received with an incorrect length (number of bits), the exchange is considered invalid, and the system does not repeat the exchange, in which case the connection event will again have failed.

For example, each connection event ECi may have a fixed duration ti in the range from about 5 ms to about 50 ms. By way of non-limiting example, a duration ti of 10 ms may be chosen. This duration allows 10 consecutive connection events to be provided during the reaction time of a user, which is approximately 100 ms before action on the maneuver. On the other hand, in the course of this duration, the vehicle, if maneuvering at a speed of 5 km/h, will have traveled only 10 cm.

It should also be noted that, in the case of a parking maneuver (at least), it is preferable for the actuation of a key T3k on the unit BC to take place continuously throughout the duration of this maneuver. However, for other types of maneuver the actuation may be one-off, and may if necessary have a chosen minimum duration.

According to the invention, following an actuation of the unit BC, the control means MCT are designed to start by determining, over a duration corresponding to a chosen main number NP of successive connection events ECi in their respective frequency channels fi, with NP>2, a first number Nm1 of failed connection events.

The control means MCT are also designed to compare the first number Nm1 with a first chosen value V1, and then to modify the activated automatic maneuver in a chosen way if the first number Nm1 is greater than or equal to the first value V1.

For example, this main number NP may be greater than or equal to 5. In the example described herein, NP may, for example, be chosen to be equal to 10. In this case, the first value V1 may, for example, be greater than or equal to 4. In the example described herein, V1 may, for example, be chosen to be equal to 8. However, other values of NP and V1 may be chosen, provided that NP is always greater than two, and that V1 is greater than or equal to two.

It should be noted that, in the case of a parking maneuver (at least), it is advantageous for the modification of the activated automatic maneuver to consist simply of the stopping of this activated automatic maneuver. However, this is not compulsory. In fact, the modification could consist of a return to the initial situation of the vehicle V (before the actuation of the unit BC), or a deceleration of the activated automatic maneuver.

Because of the invention, it is only if the number Nm1 of failed connection events is greater than or equal to the first value V1 over a sliding time interval having a duration equal to the main number NP that the control means MCT will decide to modify (or if necessary stop) the current maneuver, by immediately stopping the two-way communication.

The first value V1 is therefore a value above which it is considered that there is an actual communication problem in the area where the communication takes place (owing to interference or signal loss due to multiple paths, for example), or that there is a reception or transmission problem at the first communication module MC1, or a problem with the operation (software or hardware) of the system SC.

The invention therefore advantageously enables the performance of a maneuver, notably a parking maneuver, to be made secure.

If the two-way communication is stopped, the first communication module MC1 may inform the system SC of this, after which the system immediately ceases to determine instructions to be used for maneuvering the vehicle V. In a variant, if the two-way communication is stopped, the first communication module MC1 transmits no more data to the system SC, and the latter (SC) therefore immediately ceases to determine instructions to be used for maneuvering the vehicle V.

It should be noted that, in a variant embodiment, the control means MCT may also determine, over the duration equal to the chosen main number NP of successive connection events ECi in their respective frequency channels fi, a second number Nm2 of consecutive failed connection events. The control means MCT then compare the second number Nm2 with a second chosen value V2, smaller than or equal to the first value V1, and initiate a chosen modification of the activated automatic maneuver if the second number Nm2 is greater than or equal to this second value V2.

As mentioned above, in the case of a parking maneuver (at least), it is advantageous for the modification of the activated automatic maneuver to consist simply of the stopping of this activated automatic maneuver. However, it could consist of a return to the initial situation of the vehicle V (before the actuation of the unit BC), or a deceleration of the activated automatic maneuver.

For example, if the main number NP is greater than or equal to 5, and if the first value V1 is greater than or equal to 4, the second value V2 may be greater than or equal to 3. For example, if NP=10 and V1=8, V2 may be chosen to be equal to 6. However, other values of V2 may be chosen, provided that they are greater than or equal to two.

Figure 2:
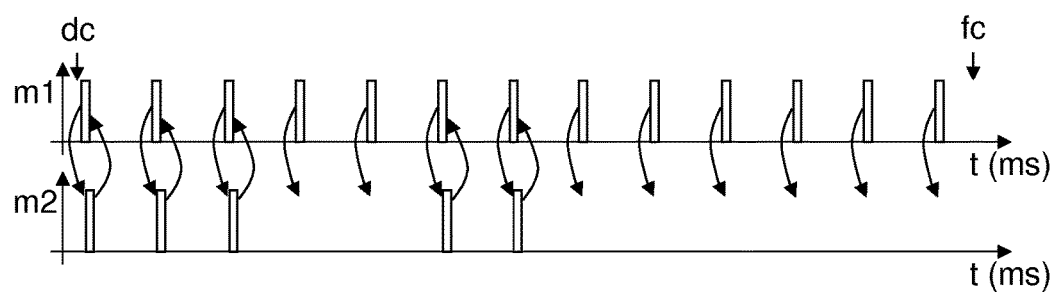
FIG. 2 shows schematically, in diagrams, an example of periodic transmission messages (m1) and an example of transmission of responses (m2) to the messages (m1).

An example of a situation corresponding to the case where NP=10, V1=8 and V2=6 is illustrated in a non-limiting way in the diagrams of FIG. 2. In fact, it can be seen in this example that, following the initiation of two-way communication at the instant identified as dc, the second communication module MC2 starts to transmit periodically a message m1 used for the control function that has been activated. The second communication module MC2 receives from the first communication module MC1, in a normal way, responses m2 to the first three messages m1 on frequencies predefined for these three responses m2, then the second communication module MC2 receives no response m2 from the first communication module MC1 on frequencies predefined for them following the transmission of the fourth and fifth first messages m1, then the second communication module MC2 again receives from the first communication module MC1, in a normal way, responses m2 to the sixth and seventh first messages m1 on frequencies predefined for these two responses m2, and finally the second communication module MC2 receives no response m2 from the first communication module MC1 on frequencies predefined for them following the transmission of the eighth, ninth, tenth, eleventh, twelfth and thirteenth first messages m1 transmitted.

Since the second communication module MC2 received no response m2 following the transmission of the fourth and fifth first messages m1, the control means MCT deduce that there were two consecutive failed connection events ECi. However, given that there was no other failed connection event ECi in the current sliding time interval with a duration of ti, the control means do not take this problem into account, and therefore still allow the communication process to continue (in this case, Nm1=2 and therefore Nm1< V2 (=6)<V1 (=8)). On the other hand, since the second communication module MC2 received no response m2 following the transmission of the eighth to the thirteenth first messages m1, the control means MCT deduce that there were six consecutive failed connection events ECi. They therefore cause the communication to stop at the instant identified as fc, which is slightly later than the instant of transmission of the thirteenth first message m1 (in this case, Nm2=6 and therefore Nm2=V2 (=6); also, Nm1=8 and therefore Nm1=V1 (=8)). Consequently, from the instant fc onward, the second communication module MC2 ceases to transmit messages m1 to the first communication module MC1, causing the maneuvers to be stopped immediately by the system SC. The user can then try again to actuate one of the keys T3k of the unit BC, in an attempt to restart and end the desired maneuver.

It should be noted that, in the illustrated non-limiting exemplary embodiment, the control means may also be designed to intervene when a control function for the central locking and unlocking of the side doors is activated by a user's actuation of one of the keys T1k, and when a control function for the central locking and unlocking of the rear hatch is activated by a user's actuation of one of the keys T2k. Clearly, in one or the other case, these means (MCT) initiate the establishment of wireless communication between the second communication module MC2 and the first communication module MC1, so that the second communication module MC2 can transmit a message used for the activated control function to the first communication module MC1.

It should also be noted that the control means MCT are preferably designed in the form of a combination of electronic circuits (or hardware) and program modules (or "software"). However, they could also be provided in the form of either program modules or electronic circuits.

It should also be noted that, in a variant embodiment which is not illustrated, the control means MCT could form part of the unit BC, rather than part of the system SC. In this case, when a maneuver control function is activated by a user of the vehicle V by means of the unit BC, the control means MCT initiate the establishment of two-way wireless communication (at radio frequencies) between the unit BC (or more precisely its second communication module MC2) and the first communication module MC1 of the vehicle V. The operation of the control means MCT is then similar to that described previously with reference to FIG. 1.

It should also be noted that, in a variant embodiment, the functions of locking and unlocking the side doors of the vehicle V and/or a rear hatch (or tailgate), and/or the functions of remote starting, are performed according to a Bluetooth Smart® protocol, regardless of whether or not a hands-free link is present. In this case, and given that these operations are not performed during movement, and therefore do not entail any risk in their execution, it will be unnecessary to use the determination of the number of consecutive or non-failed connection events. The function will be activated as soon as a connection event ECi has succeeded. (Bluetooth is a registered trademark of Bluetooth SIG, Inc.)

It is important to note that the invention may also be viewed as a (wireless) remote control method which can, notably, be implemented by means of a unit BC of the type described above and a control system SC of the type described above. Since the functions offered by the execution of the method according to the invention are identical to those offered by the control system SC and the unit BC described above, only the combination of main functions offered by the method is described below.

This remote control method comprises:
 a step (i) in which a first number Nm1 of failed connection events is determined over a duration corresponding to a chosen main number NP of successive connection events ECi in their respective frequency channels fi, where NP>2;
 a step (ii) in which this first number Nm1 is compared with a first chosen value V1, and
 a step (iii) in which the activated automatic maneuver is modified in a chosen way if the first number Nm1 is greater than or equal to this first value V1.

The invention claimed is:

1. A method for remotely controlling a system for controlling at least one automatic maneuver of a vehicle via the establishment of two-way wireless communication between a remote control unit and a communication module of said vehicle, the method comprising:
 following an actuation of said unit, said two-way communication being configured to result in an exchange of information, for the purposes of an activated automatic maneuver, between said remote control unit and said communication module, in the course of connection events having a chosen duration, which are repeated periodically in frequency channels differing from one connection event (ECi) to another according to a predetermined hopping protocol, and which may be either successful or failed;
 a step (i) for determining, by the remote control unit, a first number (Nm1) of failed connection events over a sliding duration corresponding to a chosen main number (NP) of successive connection events in their respective frequency channels, where the chosen main number (NP) is greater than 2;
 a step (ii) of comparing said first number (Nm1) with a first chosen value; and
 a step (iii) of modifying said activated automatic maneuver in a chosen way when said first number (Nm1) is greater than or equal to said first chosen value,
 wherein, within the chosen main number (NP) of successive connection events, at least two successful connection events occur in addition to the first number (Nm1) of failed connection events over the sliding duration.

2. The method as claimed in claim 1, wherein, said step (i) further comprises, determining a second number of consecutive failed connection events over said duration corresponding to the chosen main number of successive connection events in their respective frequency channels, wherein, said step (ii) further comprises, comparing said second number with a second chosen value, smaller than or equal to said first value, and wherein, said step (iii) further comprises, modifying said activated automatic maneuver in a chosen way when said second number is greater than or equal to said second value.

3. The method as claimed in claim 1, wherein, said step (iii) further comprises, stopping said activated automatic maneuver when said first number is greater than or equal to said first value, or when said second number is greater than or equal to said second value.

4. The method as claimed in claim 1, wherein each connection event has a fixed duration in the range from about 5 ms to about 50 ms.

5. The method as claimed in claim 4, wherein said duration is equal to 20 ms.

6. The method as claimed in claim 1, wherein said main number is greater than or equal to 5.

7. The method as claimed in claim 6, wherein said first value is greater than or equal to 4.

8. The method as claimed in claim 7, wherein said second value is greater than or equal to 3.

9. The method as claimed in claim 1, wherein said two-way communication between said unit and said communication module of the vehicle is of a type chosen from a group comprising standard wireless protocols.

10. The method as claimed in claim 9, wherein said two-way communication between said unit and said communication module of the vehicle is of a low energy wireless protocol type.

11. The method as claimed in claim 1, wherein said automatic maneuver is chosen from a group comprising at least a maneuver for automatic parking in a parking place, a maneuver for automatic departure from a parking place, a maneuver for opening a side door of said vehicle, a maneuver for closing a side door of said vehicle, a maneuver for opening a tailgate or hatch of said vehicle, and a maneuver for closing a tailgate or hatch of said vehicle.

12. The method as claimed in claim 1, wherein the actuation of said unit is continuous.

13. A control system for controlling at least one automatic maneuver performed by a vehicle via establishment of two-way wireless communication between a communication module of said vehicle and a remote control unit,
wherein following an actuation of the remote control unit, said two-way communication being configured to result in an exchange of information, for the purposes of the at least one activated automatic maneuver, between said communication module and said unit, in the course of connection events having a chosen duration, which are repeated periodically in frequency channels differing from one connection event to another according to a predetermined hopping protocol, and which may be either successful or failed,
the control system comprising:
a controller configured to determine, over a sliding duration corresponding to a chosen main number (NP) of successive connection events in their respective frequency channels, where the chosen main number (NP) is greater than 2, a first number (Nm1) of failed connection events, then to compare said first number (Nm1) with a first chosen value, and to modify said activated automatic maneuver in a chosen way when said first number (Nm1) is greater than or equal to said first value,
wherein, within the chosen main number (NP) of successive connection events, at least two successful connection events occur in addition to the first number (Nm1) of failed connection events over the sliding duration, and
wherein the at least one automatic maneuver includes an automatic parking maneuver.

14. The system as claimed in claim 13, wherein said two-way communication is of a type chosen from a group consisting of standard wireless protocols.

15. The system as claimed in claim 14, wherein said two-way communication between said unit and said communication module of the vehicle is of a low energy wireless protocol type.

16. The control system of claim 13, wherein the activated automatic maneuver performed by the vehicle selected from the group consisting of parking maneuvers, locking a door or hatch, and unlocking a door or hatch.

17. A remote control unit capable of remotely controlling a control system for controlling at least one automatic maneuver of a vehicle via establishment of two-way wireless communication between the unit and a communication module of said vehicle, following an actuation of the unit, said two-way communication being configured to result in an exchange of information, for the purposes of an activated automatic maneuver, between the unit and said communication module, in the course of connection events having a chosen duration, which are repeated periodically in frequency channels differing from one connection event to another according to a predetermined hopping protocol, and which may be either successful or failed, the remote control unit comprising:
control means configured to determine, over a sliding duration corresponding to a chosen main number (NP) of successive connection events in their respective frequency channels, where the chosen main number (NP) is greater than 2, a first number (Nm1) of failed connection events, then to compare said first number (Nm1) with a first chosen value, and to modify said activated automatic maneuver in a chosen way when said first number (Nm1) is greater than or equal to said first value,
wherein, within the chosen main number (NP) of successive connection events, at least two successful connection events occur in addition to the first number (Nm1) of failed connection events over the sliding duration.

\* \* \* \* \*